(12) United States Patent
Hou et al.

(10) Patent No.: US 12,075,546 B2
(45) Date of Patent: Aug. 27, 2024

(54) LIGHTING APPARATUS

(71) Applicant: XIAMEN ECO LIGHTING CO. LTD., Xiamen (CN)

(72) Inventors: Shouqiang Hou, Xiamen (CN); Yongzhe Dong, Xiamen (CN); Xiaoliang Wen, Xiamen (CN); Qiqing Yu, Xiamen (CN)

(73) Assignee: XIAMEN ECO LIGHTING CO. LTD., Xiamen (CN)

( * ) Notice: Subject to any disclaimer, the term of this patent is extended or adjusted under 35 U.S.C. 154(b) by 220 days.

(21) Appl. No.: 16/858,533

(22) Filed: Apr. 24, 2020

(65) Prior Publication Data

US 2020/0404768 A1 Dec. 24, 2020

(30) Foreign Application Priority Data

| Jun. 19, 2019 | (CN) | 201920927665.5 |
| Jun. 19, 2019 | (CN) | 201920927954.5 |
| Jun. 19, 2019 | (CN) | 201920928518.X |

(51) Int. Cl.
*H05B 47/195* (2020.01)
*H02J 50/00* (2016.01)
*H05B 45/20* (2020.01)

(52) U.S. Cl.
CPC .......... *H05B 47/195* (2020.01); *H02J 50/005* (2020.01); *H05B 45/20* (2020.01)

(58) Field of Classification Search
CPC ..... H05B 47/195; H05B 45/20; H02J 50/005; H02J 7/025; F21S 8/04; F21Y 2103/20; F21Y 2115/10
See application file for complete search history.

(56) References Cited

U.S. PATENT DOCUMENTS

| 10,724,723 B2* | 7/2020 | Johnson | H05B 47/115 |
| 2010/0328952 A1* | 12/2010 | Chen | F21V 17/02 |
| | | | 362/249.05 |
| 2012/0306377 A1* | 12/2012 | Igaki | F21K 9/278 |
| | | | 315/154 |
| 2015/0173157 A1* | 6/2015 | Setomoto | H05B 47/19 |
| | | | 315/153 |
| 2015/0289349 A1* | 10/2015 | Kim | F21V 23/0435 |
| | | | 315/51 |
| 2016/0286619 A1* | 9/2016 | Roberts | H05B 47/105 |
| 2017/0146197 A1* | 5/2017 | Slosberg | F21V 3/02 |
| 2018/0160509 A1* | 6/2018 | Treible, Jr. | F21V 23/06 |
| 2018/0279429 A1* | 9/2018 | Sadwick | H05B 45/3725 |

(Continued)

*Primary Examiner* — Alexander H Taningco
*Assistant Examiner* — Pedro C Fernandez
(74) *Attorney, Agent, or Firm* — Chun-Ming Shih; LANWAY IPR SERVICES

(57) ABSTRACT

A lighting apparatus includes a container housing, a surrounding wall, a light source module and an attached device. The light passing cover is coupled to the surrounding wall forming a container space. The light passing cover has a first window and a second window. The light source module has multiple LED modules. The light source module is stored in the container space. A light of the light source module is passing through the first window of the light passing cover. The attached device is attached to the second window. The attached device is used for receiving a user command to control the multiple LED modules of light source module for mixing a requested color temperature.

9 Claims, 13 Drawing Sheets

(56) References Cited

U.S. PATENT DOCUMENTS

2018/0306423 A1\* 10/2018 Ando .................... F21V 23/003
2020/0018469 A1\* 1/2020 Kohen ................... G08B 21/02
2020/0173613 A1\* 6/2020 Zhang ..................... H04B 1/08

\* cited by examiner

LIGHTING APPARATUS

FIELD

The present invention is related to a lighting apparatus and more particularly related to a lighting apparatus with smart control function.

BACKGROUND

Lighting or illumination is the deliberate use of light to achieve a practical or aesthetic effect. Lighting includes the use of both artificial light sources like lamps and light fixtures, as well as natural illumination by capturing daylight. Daylighting (using windows, skylights, or light shelves) is sometimes used as the main source of light during daytime in buildings. This can save energy in place of using artificial lighting, which represents a major component of energy consumption in buildings. Proper lighting can enhance task performance, improve the appearance of an area, or have positive psychological effects on occupants.

Indoor lighting is usually accomplished using light fixtures, and is a key part of interior design. Lighting can also be an intrinsic component of landscape projects.

A light-emitting diode (LED) is a semiconductor light source that emits light when current flows through it. Electrons in the semiconductor recombine with electron holes, releasing energy in the form of photons. This effect is called electroluminescence. The color of the light (corresponding to the energy of the photons) is determined by the energy required for electrons to cross the band gap of the semiconductor. White light is obtained by using multiple semiconductors or a layer of light-emitting phosphor on the semiconductor device.

Appearing as practical electronic components in 1962, the earliest LEDs emitted low-intensity infrared light. Infrared LEDs are used in remote-control circuits, such as those used with a wide variety of consumer electronics. The first visible-light LEDs were of low intensity and limited to red. Modern LEDs are available across the visible, ultraviolet, and infrared wavelengths, with high light output.

Early LEDs were often used as indicator lamps, replacing small incandescent bulbs, and in seven-segment displays. Recent developments have produced white-light LEDs suitable for room lighting. LEDs have led to new displays and sensors, while their high switching rates are useful in advanced communications technology.

LEDs have many advantages over incandescent light sources, including lower energy consumption, longer lifetime, improved physical robustness, smaller size, and faster switching. Light-emitting diodes are used in applications as diverse as aviation lighting, automotive headlamps, advertising, general lighting, traffic signals, camera flashes, lighted wallpaper and medical devices.

Unlike a laser, the color of light emitted from an LED is neither coherent nor monochromatic, but the spectrum is narrow with respect to human vision, and functionally monochromatic.

The energy efficiency of electric lighting has increased radically since the first demonstration of arc lamps and the incandescent light bulb of the 19th century. Modern electric light sources come in a profusion of types and sizes adapted to many applications. Most modern electric lighting is powered by centrally generated electric power, but lighting may also be powered by mobile or standby electric generators or battery systems. Battery-powered light is often reserved for when and where stationary lights fail, often in the form of flashlights, electric lanterns, and in vehicles.

Although lighting devices are widely used, there are still lots of opportunity and benefit to improve the lighting devices to provide more convenient, low cost, reliable and beautiful lighting devices for enhancing human life.

SUMMARY

In some embodiments, a lighting apparatus includes a container housing, a surrounding wall, a light source module and an attached device.

The light passing cover is coupled to the surrounding wall forming a container space. The light passing cover has a first window and a second window. The light source module has multiple LED modules. The light source module is stored in the container space. A light of the light source module is passing through the first window of the light passing cover. The attached device is attached to the second window.

In some embodiments, the attached device is used for receiving a user command to control the multiple LED modules of light source module for mixing a requested color temperature. Users may use hand, a remote device or an interface of the attached device to send the command. Users may also use an audio voice to control the attached device if the attached device has a speech recognition function.

In some embodiments, the attached device is used for setting a configuration of the lighting apparatus. For example, the light source module has a first set of LED modules with a first color temperature and a second set of LED modules with a second color temperature. The attached device is used for setting a mixing ratio for activating the first set and the second set of the LED modules to mix a desired color temperature.

In some embodiments, the attached device is an infrared receiver for receiving a command from a remote control. In such case, the second window may have an isolation cover while still being able to receive an infrared command from a remote control.

In some embodiments, the attached device may be configured to receive infrared command from any remote control, e.g. a remote control originally used for controlling a television or an air conditioner.

When the controlling of the light source module is simple, any command with original purpose may be recognized as a switch command for turning on, turning off, iterating among a limited set of configurations.

In other words, the attached device may be controlled by any remote control. Moreover, there is no need to set the settings of the remote control or the attached device. Still, the attached device performs a default operation every time when the attached device detects any infrared signal.

In some embodiments, the attached device has a touch surface for a user to input a command to control the light source module. For example, a touch area is provided in the second window so that users may control the lighting apparatus via the touch area.

In some embodiments, the light passing cover has a common cover covering the first window and the second window.

In some embodiments, the second window is a concave slot on the light passing cover.

In some embodiments, the concave slot has a connecting interface for detachably attaching to the attached device. The attached device is replaceable with another attached device.

In some embodiments, the attached device receives a wireless charging from a wireless charging device behind an isolation cover.

In some embodiments, the attached device is detachable to be replaced with another attached device with another function.

In some embodiments, the attached device has a magnet unit to attach to the second window via a magnetic force of the magnet unit.

In some embodiments, an exterior surface of the attached device has a second light source emitting an additional light.

In some embodiments, the second light source shows a status of the lighting apparatus.

In some embodiments, the lighting apparatus may also include a driver box containing a driver circuit for generating a driving current to the multiple LED modules.

In some embodiments, the lighting apparatus may also include a switch module with a manual switch, wherein the switch is connected between the driver box and the container housing.

In some embodiments, the switch module is detachably from a connection between the driver box and the container housing.

In some embodiments, the switch module is detachable to be replaced with another switch module providing another function.

In some embodiments, the switch module is coupled to the driver box. The driver box is further connected to the container housing. When the switch module is attached to the driver box, a function is executed by the switch module for controlling the light source module.

In some embodiments, the switch module includes a controller. The controller replaces an original control to control the lighting apparatus if the switch module is connected to the driver box.

In some embodiments, there are multiple modules with multiple functions disposed behind the second window.

In some embodiments, there is an antenna disposed behind the second window. The second window is close to an exterior surface of the light passing cover and thus is a great position for receiving a wireless signal.

DETAILED DESCRIPTION

Figure 12:
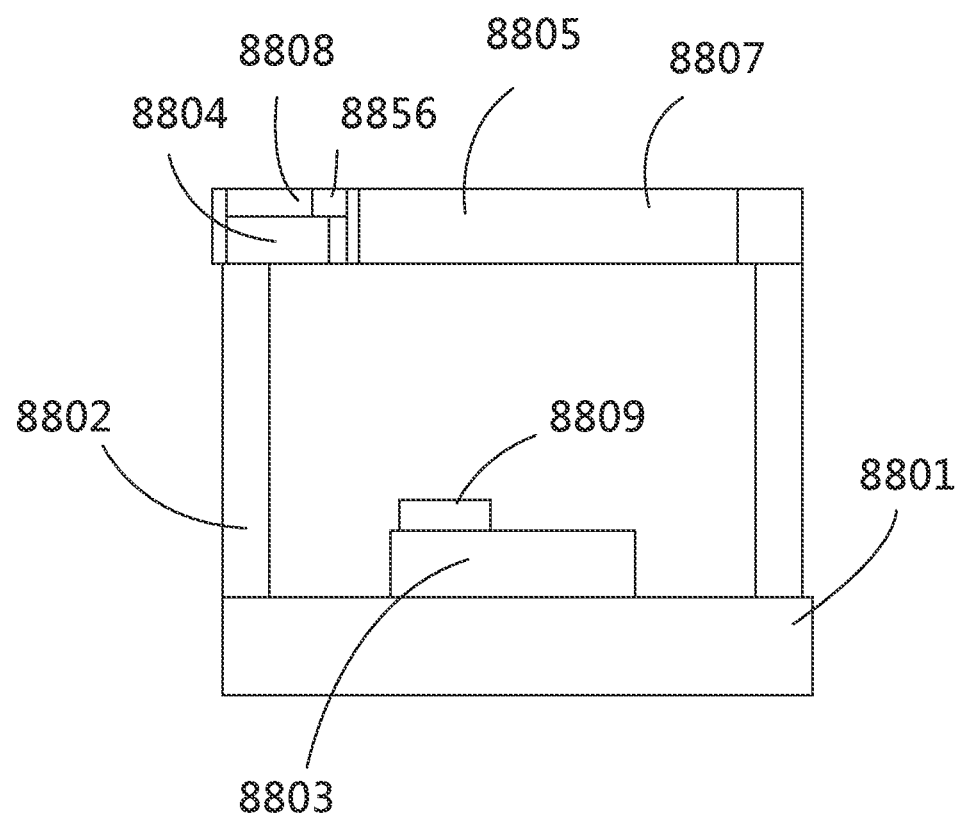
FIG. 12 shows a structure diagram of an embodiment.

In FIG. 12, a lighting apparatus includes a light passing cover 8805, a container housing 8801, a surrounding wall 8802, a light source module 8803 and an attached device 8804.

The light passing cover 8805 is coupled to the surrounding wall 8802 forming a container space 8806. The light passing cover 8805 has a first window 8807 and a second window 8808. The light source module has multiple LED modules 8809. The light source module is stored in the container space 8806. A light of the light source module is passing through the first window 8807 of the light passing cover 8805. The attached device 8804 is attached to the second window 8808.

In some embodiments, the attached device is used for receiving a user command to control the multiple LED modules of light source module for mixing a requested color temperature. Users may use hand, a remote device or an interface of the attached device to send the command. Users may also use an audio voice to control the attached device if the attached device has a speech recognition function.

In some embodiments, the attached device is used for setting a configuration of the lighting apparatus. For example, the light source module has a first set of LED modules with a first color temperature and a second set of LED modules with a second color temperature. The attached device is used for setting a mixing ratio for activating the first set and the second set of the LED modules to mix a desired color temperature.

In some embodiments, the attached device is an infrared receiver for receiving a command from a remote control. In such case, the second window may have an isolation cover while still being able to receive an infrared command from a remote control.

In some embodiments, the attached device may be configured to receive infrared command from any remote control, e.g. a remote control originally used for controlling a television or an air conditioner.

When the controlling of the light source module is simple, any command with original purpose may be recognized as a switch command for turning on, turning off, iterating among a limited set of configurations.

In other words, the attached device may be controlled by any remote control. Moreover, there is no need to set the settings of the remote control or the attached device. Still, the attached device performs a default operation every time when the attached device detects any infrared signal.

In some embodiments, the attached device has a touch surface for a user to input a command to control the light source module. For example, a touch area is provided in the second window so that users may control the lighting apparatus via the touch area.

In some embodiments, the light passing cover has a common cover covering the first window and the second window.

Figure 13:
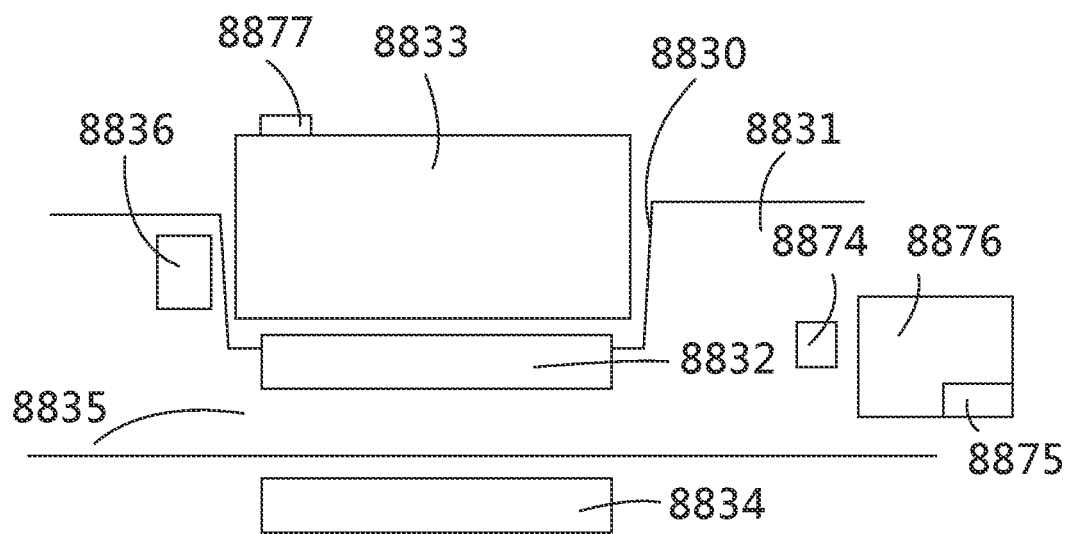
FIG. 13 shows another structure diagram of an embodiment.

In FIG. 13, the second window 8830 is a concave slot on the light passing cover 8831.

The concave slot 8830 has a connecting interface 8832 for detachably attaching to the attached device 8833. The attached device 8833 is replaceable with another attached device.

In FIG. 13, the attached device receives a wireless charging from a wireless charging device 8834 behind an isolation cover 8835.

In some embodiments, the attached device is detachable to be replaced with another attached device with another function. For example, a detector for sensing smoke as an original attached device may be replaced with a camera for security function.

In FIG. 13, the attached device has a magnet unit 8836 to attach to the second window 8830 via a magnetic force of the magnet unit 8836.

In FIG. 13, an exterior surface of the attached device has a second light source 8877 emitting an additional light.

In FIG. 13, the second light source 8877 shows a status of the lighting apparatus.

In FIG. 13, the lighting apparatus may also include a driver box 8876 containing a driver circuit 8875 for generating a driving current to the multiple LED modules.

In FIG. 13, the lighting apparatus may also include a switch module with a manual switch 8874, wherein the manual switch 8874 is connected between the driver box 8875 and the container housing.

In some embodiments, the switch module is detachably from a connection between the driver box and the container housing. For example, the switch module is inserted between a pair of sockets of the driver box and the container housing.

In some embodiments, the switch module is detachable to be replaced with another switch module providing another function.

In some embodiments, the switch module is coupled to the driver box. The driver box is further connected to the container housing. When the switch module is attached to the driver box, a function is executed by the switch module for controlling the light source module.

In some embodiments, the switch module includes a controller. The controller replaces an original control to control the lighting apparatus if the switch module is connected to the driver box.

In some embodiments, there are multiple modules with multiple functions disposed behind the second window. In other words, more than one attached device may be disposed behind or below and covered by the second window.

In FIG. 12, there is an antenna 8856 disposed behind the second window. The second window is close to an exterior surface of the light passing cover and thus is a great position for receiving a wireless signal.

Please refer to FIG. 1, FIG. 2, FIG. 6 and FIG. 7 for the following description. This embodiment provides a ceiling light. It includes a base plate 1, a shell 2, a light source module 3, a driver module 4, and a color temperature switch module 5. Among them, the shell 2 is disposed on the base plate 1 to form a storing space. The light source module 3, the driver module 4, and the color temperature switch module 5 is all stored within. In detail, the light source module 3 is disposed on the base plate 1. The light source module 3 is ring-shaped. The driver module 4 and the light source module 3 is electrically connected. The color temperature switch module 5 and the driver module 4 is electrically connected. The color temperature switch module 5 goes through the shell 2 and is exposed on the outer surface of the shell 2. This makes it easier for the color temperature switch module 5 to receive signals in order to control the light source module 3's color temperature adjustment through the driver module 4.

The ceiling light in this embodiment uses the color temperature switch module 5 to switch color temperatures. Because the color temperature switch module 5 and the driver module 4 is electrically connected, and that the color temperature switch module 5 goes through the shell 2 and is exposed on the outer surface of the shell 2, when the assembling of the ceiling lights is completed, this makes it easier for users to operate the color temperature switch module 5. Furthermore, control the color temperature switch of the ceiling lights through the driver module 4. It could be adjusted according to needs, switch color temperature intelligently, and does not require detachment of the light body. As a result, the operating measures are simplified, making it user friendly.

In this embodiment, the shell 2 and the base plate 1 are both square shaped. Of course, as in FIG. 6 and FIG. 7, the shell 2 and the base plate 1 are all round-shaped in other embodiments.

In an embodiment, the color temperature switch module 5 includes an infrared control module, a touch sensor module, a Bluetooth control module, or a remote control module. In detail, the color temperature switch module 5 includes a control module 51 and multiple connector line 52. One end of the connector line 52 is connected to the control module 51. The other end is electrically connected with the driver module 4. The control module 51 uses the connector line 52 to electrically connect with the driver module 4. This is to provide power and switch signals. The control module 51 uses infrared sensor, touch sensor, Bluetooth control or remote control to control the driver module 4. Among them, the driver module 4 uses three-line drives. The light source module 3's two-color can be achieved through the driver module 4 controlled by the control module 51.

Figure 4:
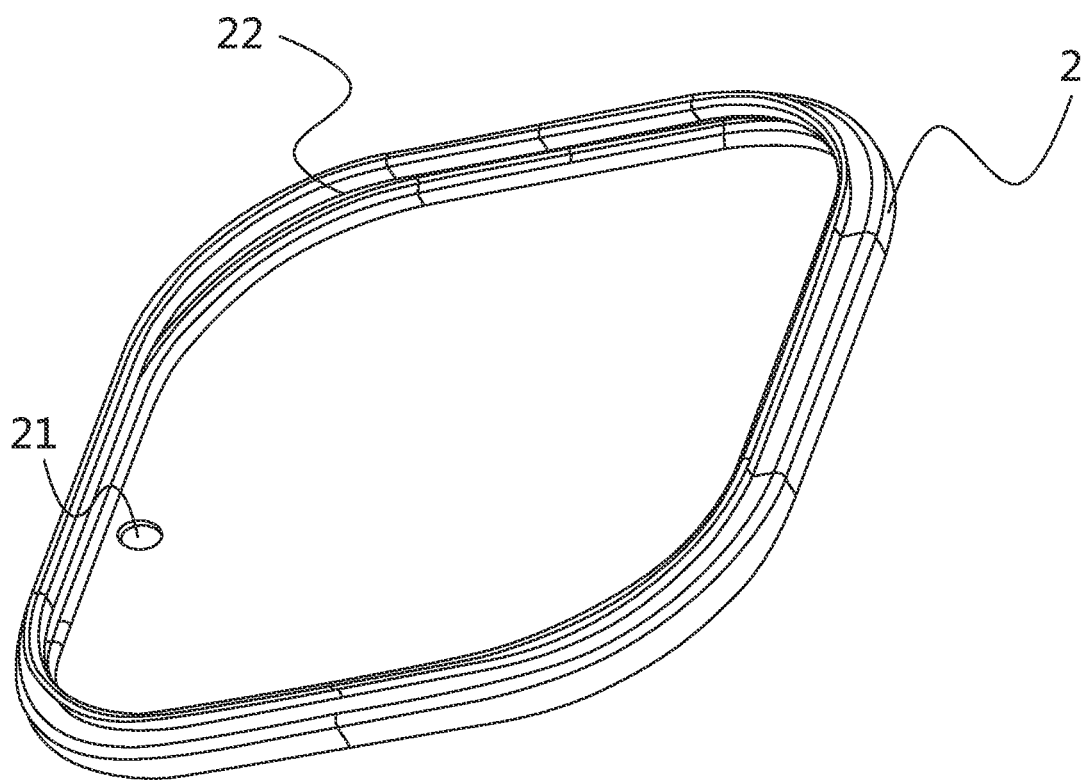
FIG. 4 shows another component.

In an embodiment, combined with FIG. 4, the shell 2's front and side are disposed with through hole 21. The control module 51 passes through the through hole 21 and out of the shell 2. Through hole 21's shape is in correspondence with the control module 51's shape. "The front of the shell 2" is the side where the shell 2 is facing the light source module 3. The through hole 21 disposed on the shell 2's front makes it easier for users to control. Disposing the through hole 21 on the side of the shell 2 adds beauty to the ceiling light when viewed from front, and does not cause problems when in use. Of course, the control module 51 can also be disposed on and extended out of the ceiling light's other parts as long as it doesn't affect the transfer of the control module 51's signal.

Figure 8:
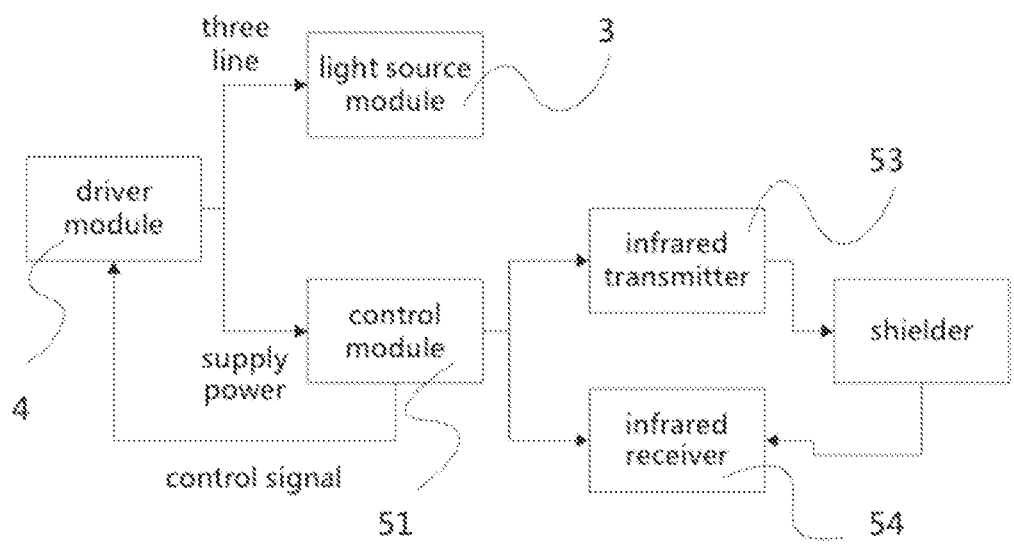
FIG. 8 shows a structure diagram of an embodiment.

In detail, please refer to FIG. 8. When the color temperature switch module 5 uses infrared control module, it means that the color temperature switch module 5 is disposed with infrared transmitting tube 53 and infrared receiving tube 54. Among them, the infrared transmitting tube ejects infrared ray, and the infrared receiving tube 54 receives and sensors the infrared ray ejected from the infrared transmitting tube 53. The infrared transmitting tube 53 ejects an infrared ray pulse, the pulse bounces back from an object and is received by the infrared receiving tube 54 to determine if there are obstacles in front. When users need to adjust the color temperature of the ceiling light, simply place their hand or any object at the color temperature switch module 5's protruding spot. The infrared ray ejected from the infrared transmitting tube 53 within the color temperature switch module 5 will bounce back once it senses a hand or objects. After the infrared receiving tube 54 receives the bounced back ray, the control module 51 will transmit signals to control the driver module 4's driver mode. The driver module 4 will control the light source module 3's color temperature according to the signal sent out by the control module 51. That is to say, hands or other objects are not required to touch the color temperature switch module 5.

Figure 9:
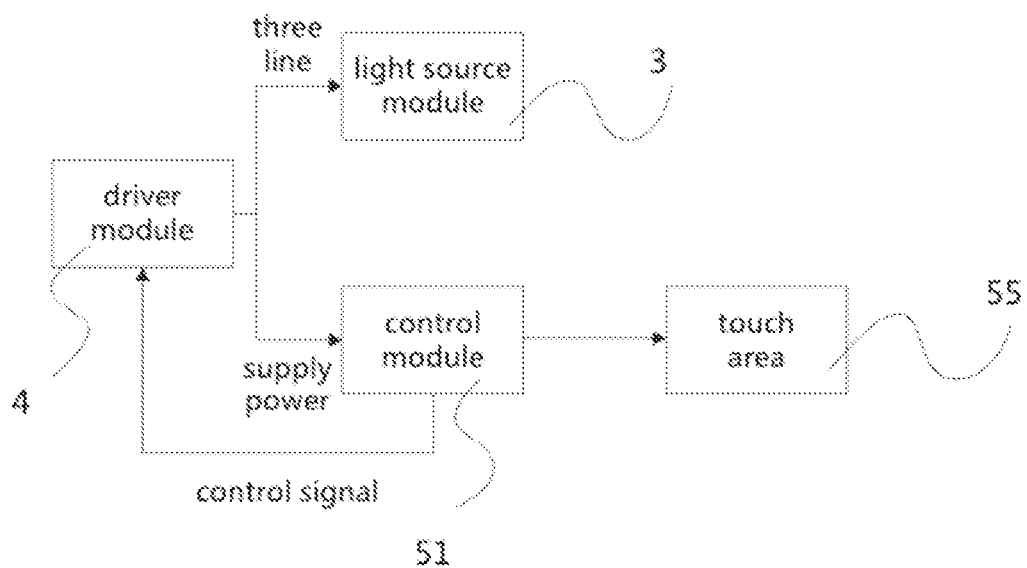
FIG. 9 shows another structure diagram of an embodiment.

As in FIG. 9, when the color temperature switch module 5 uses touch sensor module, a sensor metal plate 55 is disposed within the color temperature switch module 5. When the sensor metal plate 55 is touched, is creates a volt. The control module 51 receives the volt and sends out corresponding controlling signals to the driver module 4. The light source module 3 will then be adjusted accordingly. When users need to adjust the ceiling light's color temperature, simply use their hands or other objects to touch the color temperature switch module 5. Please keep in mind that the sensor metal plate 55 cannot be grounded. It can be isolated with non-metal to prevent it from grounding.

The Bluetooth control or the remote control is mainly used for controlling the control module 51's transmitting signal through Bluetooth or remote control.

Of course, there are other ways to achieve the color temperature switch module 5's color temperature switch.

Figure 1:
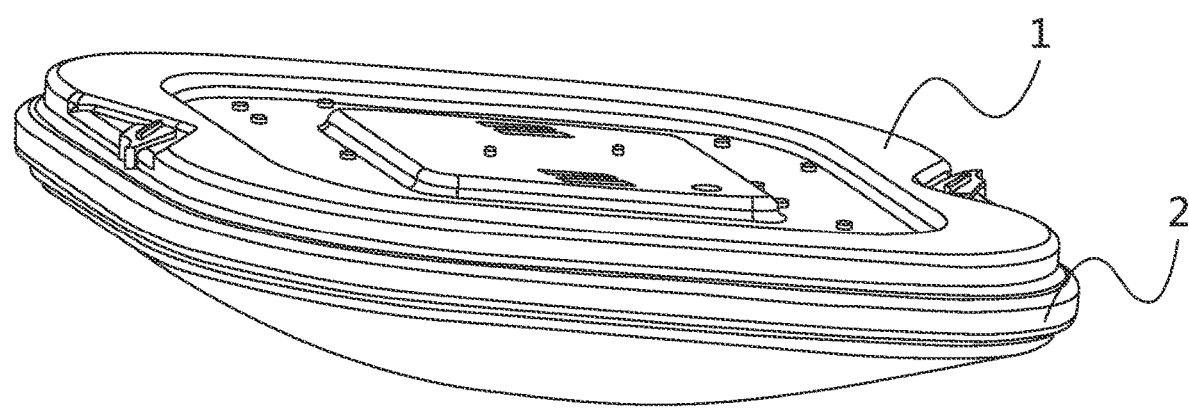
FIG. 1 illustrates an embodiment of a lighting apparatus.
Figure 2:
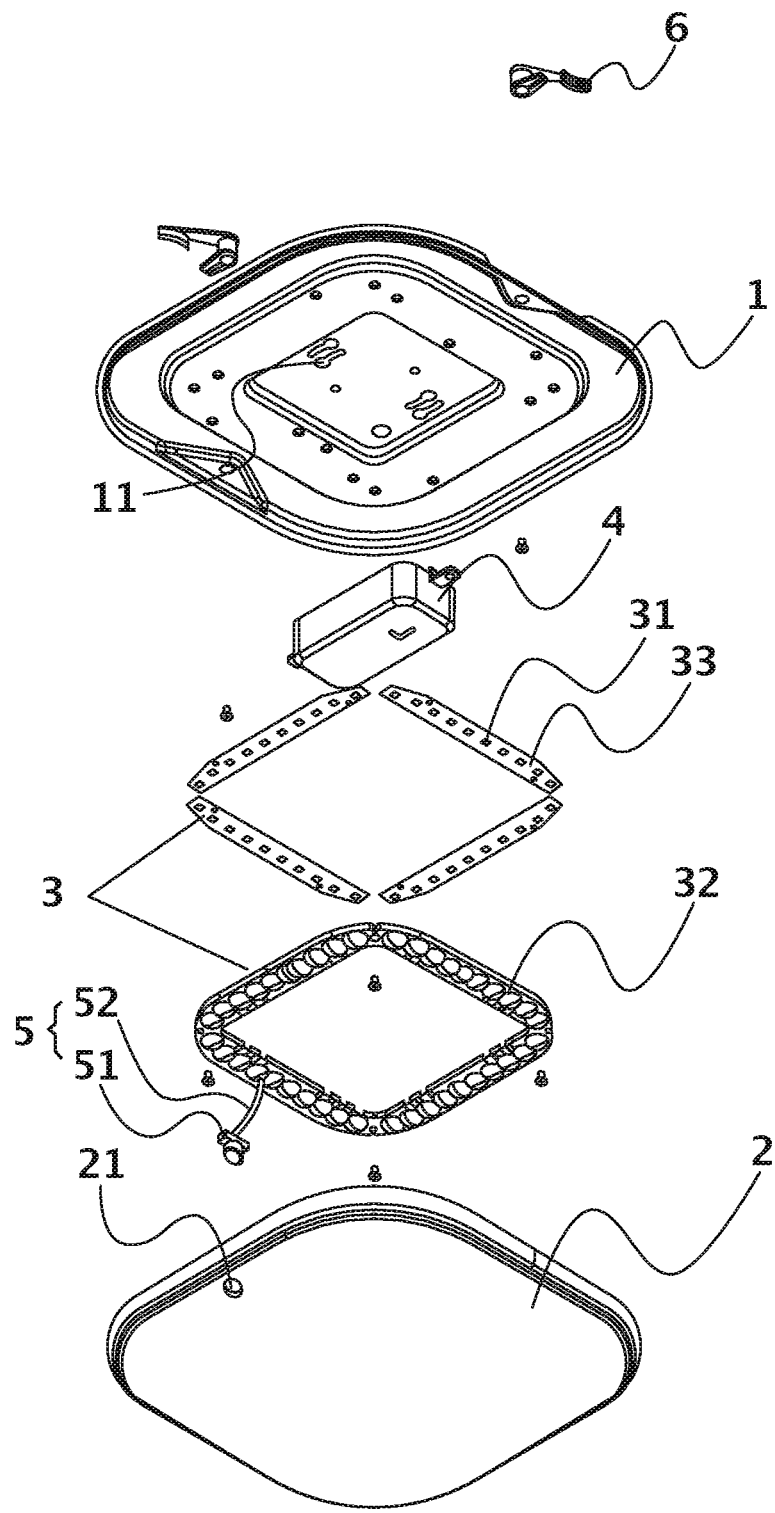
FIG. 2 illustrates an exploded diagram showing components.
Figure 7:
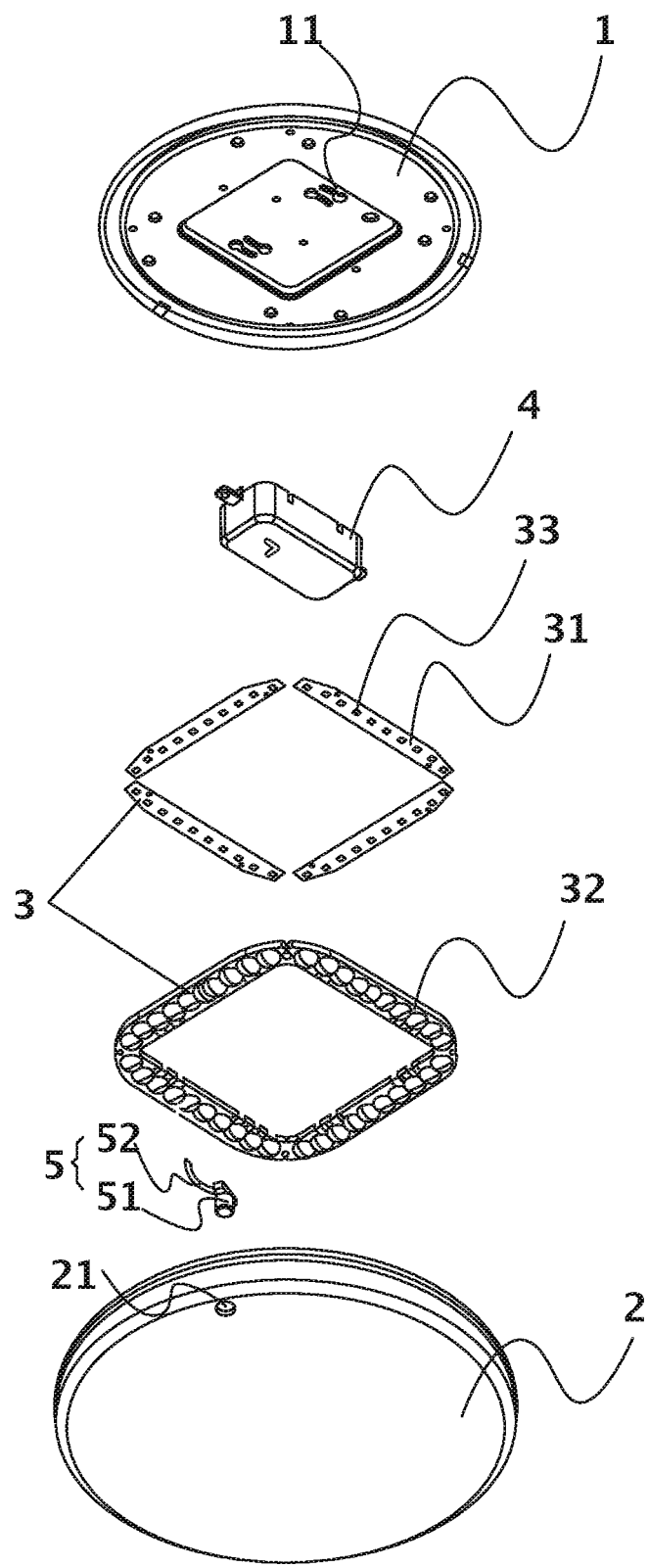
FIG. 7 shows an exploded view of an embodiment.

Please refer to FIG. 2 and FIG. 7 for the following description. In an embodiment, the light source module 3 includes a light source plate 31 and lens set 32. Among them, there has to be at least one light source plate 31, and one ring shape piece formed by at least one light source plate 31. Lens set 32 should be made in one piece and should be disposed in correspondence with at least one of the light source plate 31 mentioned above. The lens set 32 is in ring shape piece and is disposed in correspondence with at least one of the light source plate 31 mentioned above.

Among them, in this embodiment, there are four light source plate 31. The four light source plate 31 forms a rectangular ring. The driver module 4 is within the rectangular ring. The lens set 32 is disposed in correspondence with the rectangular ring's light source plate 31. The lens set 32 also forms a rectangular ring, and it comes in one piece. All sides of the lens set 32 is excessively smooth.

Figure 3:
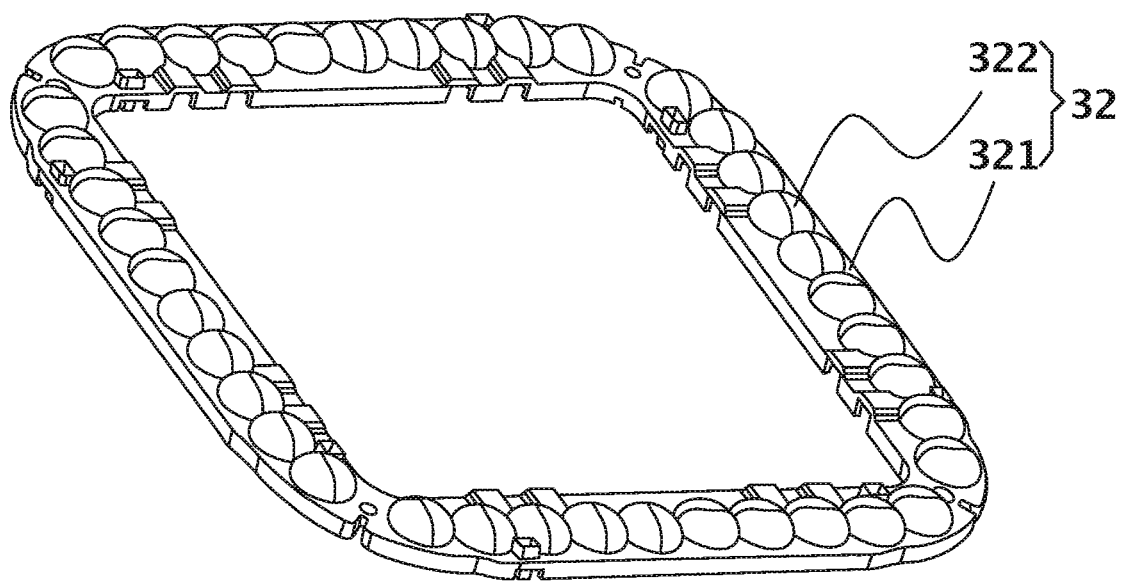
FIG. 3 shows a light source with lens.

In an embodiment, combined with FIG. 3, the light source module 3 includes at least one LED light source 33 that's disposed on the light source plate 31. Lens set 32 includes a lens plate 321 and a lens unit 322. Among them, the lens plate 321 is disposed in correspondence with at least one of the light source plate 31 mentioned above. The lens plate 321 is ring-shaped. There should be at least one lens unit 322 protruding on the side away from lens plate 321's LED light source 33. The lens unit 322 and the LED light source 33 is disposed correspondently. The protruding lens unit 322 is disposed in accordance with LED light source 33. The lens unit 322 scatters the light emitted from the LED light source 33. This is to provide the light emitted from the lens set 32 with many different angles. In detail, two lens unit 322 is disposed side to side.

Among them, in this embodiment, the lens unit 322's longitudinal section is shaped like a curve. The cross section is shaped like a protruding circle. Of course, the shape of the lens unit 322 can be a protruding hexagon. Then the cross section of the lens unit 322 would be in hexagon-shaped. Or if the lens unit 322 is shaped like a protruding diamond, then the cross section would be in the shape of a diamond.

Figure 5:
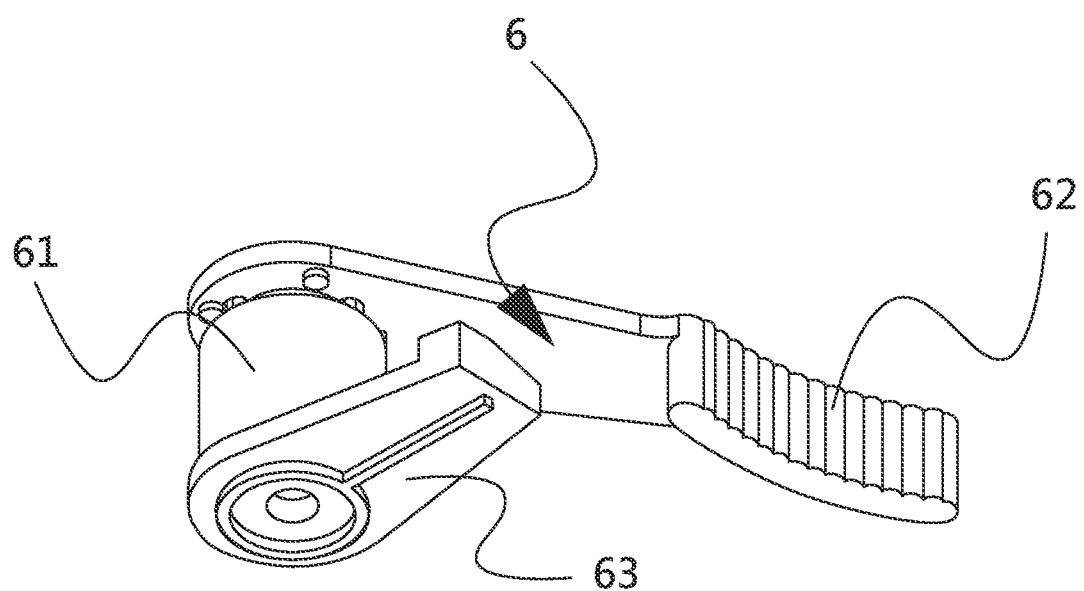
FIG. 5 shows a fixing structure.
Figure 6:
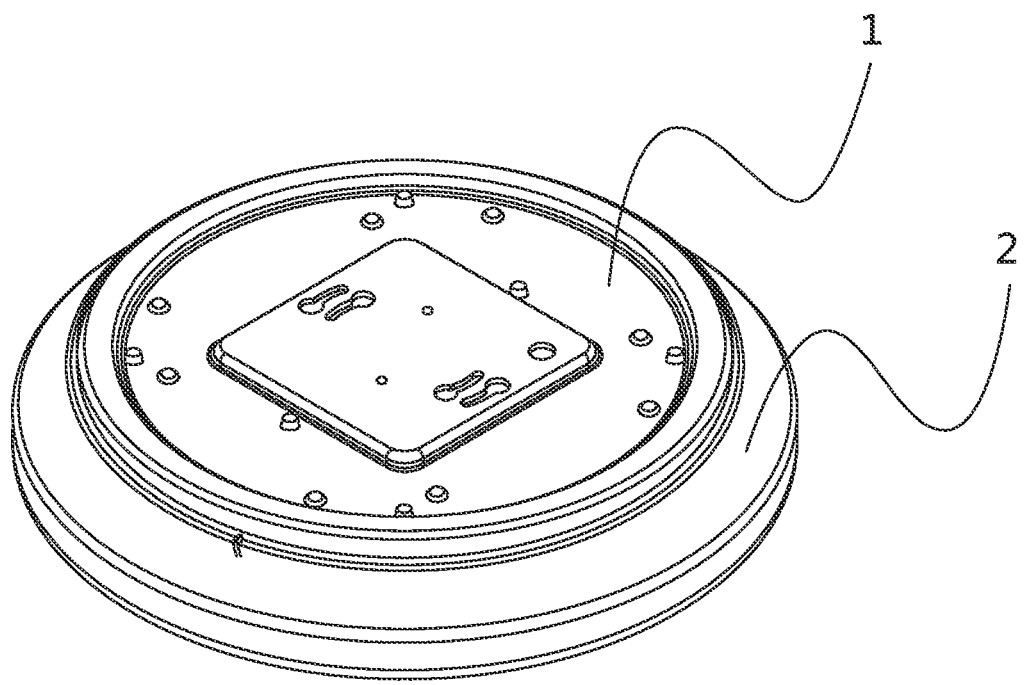
FIG. 6 shows a plate component.

In an embodiment, combined with FIG. 2 and FIG. 5, the ceiling light includes an installation buckle 6 that is disposed through the base plate 1. The shell 2 goes through the installation buckle 6 and buckles with the base plate 1. Among them, the installation buckle 6 is disposed through the base plate 1 so that both ends of the installation buckle 6 can be disposed on both sides of the base plate 1. The ring buckle groove 22 is disposed on the inner wall of the shell 2. One end of the installation buckle 6 that is near the shell 2 buckles with the ring buckle groove 22. The other end of the installation buckle 6 that's away from the shell 2 is used to install the base plate 1 on the installation place.

In an embodiment, please refer to FIG. 5, the above mentioned installation buckle 6 includes a shaft section 61, a buckle 62 and a hook body 63. Among them, the shaft section 61 is disposed on the base plate 1. With the shaft section 61 disposed through the has plate 1, the buckle 62 is connect with one end of the shaft section 61 that is away from the shell 2. This is to install the base plate 1 on the installing place. The hook body 63 is connected with one end of the shaft section 61 that is towards the shell 2. The other end of the hook body 63 that is away from the shaft section 61 is buckled with the ring buckle groove 22. In detail, the buckle 62 and the shaft section 61 rotates connectedly. This makes it easier for users when pushing the buckle 62. The base plate 1 will install in the ceiling accordingly. To increase the friction between the buckle 62 and the hand of the user, one end of the buckle 62 that is away from the shaft section 61 is disposed evenly with multiple protruding portions. This heightens the senses when touched, and simultaneously increased the friction between the buckle 62 and the users hand, making it easier to toggle.

In an embodiment, as in FIG. 2 and FIG. 7, in order to securely install the base plate 1 on the ceiling, the base plate 1 is disposed with installing hole 11 for the base plate 1's installing purposes. Among them, the installing hole 11 is a sinkhole, making it easier to place the light source module 3. This prevents the light source module 3 from being placed unevenly, causing the light ejection of the light source module 3.

In detail, the entire ceiling light installment is described as follow.

First, prepare a base plate 1. The installation buckle 6 should go through the base plate 1 and rotate the buckle 62 of the installation buckle 6. This is for the buckle 62 to be disposed in the corresponding installing place. Screws should go through the base plate 1's installing hole 11 to secure installment in the corresponding installing place. Next, use screw-like securing pieces to dispose the light source module 3 on the corresponding place on the base plate 1. The driver module 4 should be installed within the light source module 3. Lastly, align the shell 2's ring buckle groove 22 with the installation buckle 6's hook body 63, and buckle the book body 63 with the ring buckle groove 22. The installment of the ceiling light is therefore complete.

Figure 10:
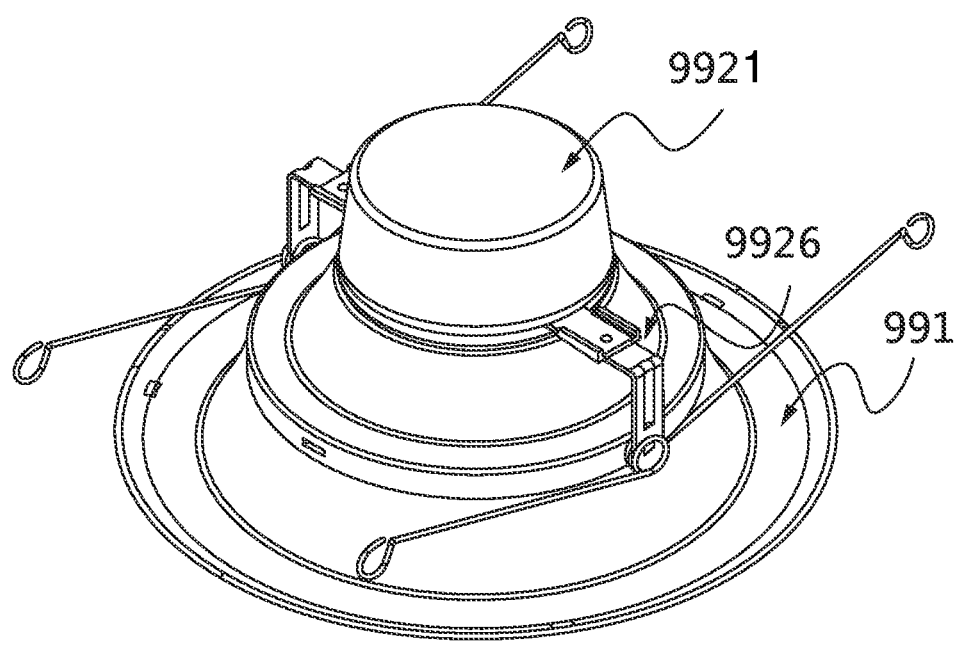
FIG. 10 shows another embodiment.
Figure 11:
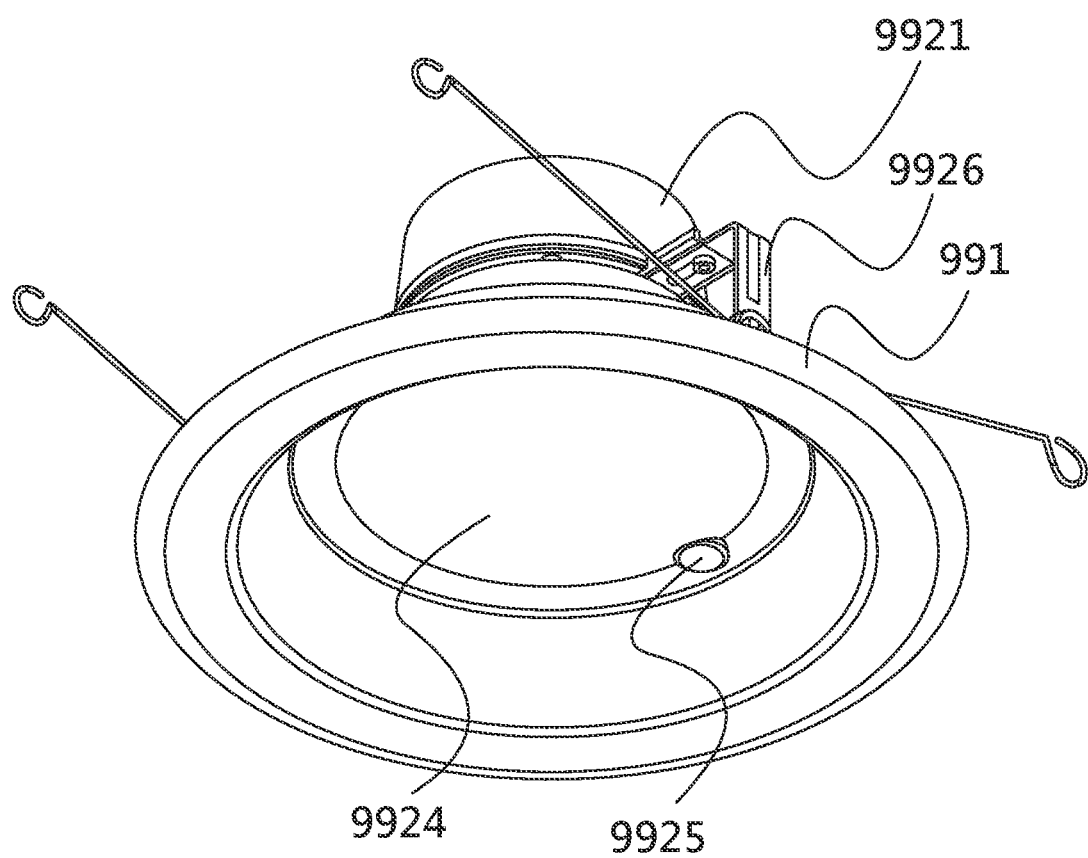
FIG. 11 shows another view of the embodiment in FIG. 10.

Please refer to FIG. 10 to FIG. 11 for the following description. This embodiment provides a downlight apparatus. It is installed on the ceiling for lighting purposes. The downlight apparatus includes a tube body 991, a driver module 9921, a light source module 9922, a reflector cup 9923, a translucent cover 9924 and an intelligent module 9925. In detail, the driver module 9921 and the light source module 9922 is both disposed on the tube body 991. The driver module 9921 and the light source module 9922 is electrically connected. The reflector cup 9923 and the translucent cover 9924 is both disposed within the tube body 991. The light emitted from the light module 9922 reflects through the reflector cup 9923 and emitted through the translucent cover 9924 and out of the tube body 991. The intelligent module 9925 can control the downlight apparatus' color temperature switch and is disposed within the tube body 991. The intelligent module 9925 and the driver module 9921 is electrically connected. The intelligent module 9925 goes through the translucent cover 9924 and is exposed on the translucent cover 9924's outer surface. This makes it easier for the intelligent module 9925 to receive signals in order to control the driver module 9921 to achieve the downlight apparatus' color temperature switch.

The downlight apparatus in this embodiment uses the intelligent module 9925 to achieve switching color temperatures. Through electrically connecting the intelligent module 9925 and the driver module 9921, the intelligent module 9925 goes through the translucent cover 9924 and is exposed on the outer surface of the translucent cover 9924. This makes it easier for users to operate the intelligent module 9925 once it is installed. By delivering signals to the driver module 9921, the color temperature switch could be controlled by the light source module 9922. No detachment is required. The color temperature switch can be performed anytime throughout the lighting, making is user friendly and convenient.

In an embodiment, the intelligent module 9925 includes a control module 99251 and a control module 99251's connector line 99252. Among them, the control module 99251 is disposed on the reflector cup 9923. The reflector cup 9923 is used to secure the control module 99251 and goes through the translucent cover 9923. One end of the connector line 99252 that's away from the control module 99251 goes through the tube body 991, the light source module 9922 and electrically connects with the driver module 9921. The control module 99251 goes through the translucent cover 9924 in order to let the control module 99251 sense the user's hand or other objects. This sends a signal to the driver module 9921 to control the light source module 9922 to switch between color temperatures. The control module 99251 goes through the connector line 99252 and is electrically connected with the driver module 9921 to achieve providing power and switching signals.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A lighting apparatus, comprising:
   a container housing, providing a surrounding wall;
   a light passing cover coupled to the surrounding wall forming a container space, the light passing cover having a first window and a second window;
   a light source module with multiple LED modules, the light source module being stored in the container space, a light of the light source module being passing through the first window of the light passing cover;
   an attached device attached to the second window, wherein the attached device is an infrared receiver for receiving a command from a remote control wherein the second window has an isolating cover that allows infrared light to pass through to receive the command from the remote control;
   a driver box containing a driver circuit for generating a driving current to the multiple LED modules; and
   a switch module with a manual switch, wherein the manual switch is connected between the driver box and the container housing, wherein the switch module is detachable to be replaced with another switch module providing another function.

2. The lighting apparatus of claim 1, wherein the attached device is used for receiving a user command to control the multiple LED modules of light source module for mixing a requested color temperature.

3. The lighting apparatus of claim 1, wherein the attached device has a touch surface for a user to input a command to control the light source module.

4. The lighting apparatus of claim 1, wherein the light passing cover has a common cover covering the first window and the second window.

5. The lighting apparatus of claim 1, wherein the switch module is detachably from a connection between the driver box and the container housing.

6. The lighting apparatus of claim 1, wherein the switch module is coupled to the driver box, the driver box is further connected to the container housing, when the switch module is attached to the driver box, a function is executed by the switch module for controlling the light source module.

7. The lighting apparatus of claim 6, wherein the switch module comprises a controller, the controller replaces an original control to control the lighting apparatus if the switch module is connected to the driver box.

8. The lighting apparatus of claim 1, wherein there are multiple modules with multiple functions disposed behind the second window.

9. The lighting apparatus of claim 8, wherein there is an antenna disposed behind the second window.

* * * * *